United States Patent [19]

Nakamura

[11] 4,245,553
[45] Jan. 20, 1981

[54] BEAN TREATING APPARATUS

[75] Inventor: Hiroshi Nakamura, Iida, Japan

[73] Assignee: Asahimatsu Koridofu Kabushiki Kaisha, Nagano, Japan

[21] Appl. No.: 941,586

[22] Filed: Sep. 12, 1978

[30] Foreign Application Priority Data

Sep. 22, 1977 [JP] Japan .................. 52-114060

[51] Int. Cl.³ .............................................. A23N 7/00
[52] U.S. Cl. ....................... 99/628; 209/156
[58] Field of Search ............. 99/628, 623, 624, 617, 99/568, 569, 570; 209/155, 156, 157, 162, 163, 173

[56] References Cited

U.S. PATENT DOCUMENTS

| 1,380,023 | 5/1921 | Roussillon | 99/570 |
| 1,448,310 | 3/1923 | Merwin | 209/156 |
| 1,591,251 | 7/1926 | Vaughan | 99/628 X |
| 2,082,467 | 6/1937 | Prins | 209/156 |
| 2,119,006 | 5/1938 | Chapman | 209/156 |
| 2,206,748 | 7/1940 | Moore | 99/628 |
| 2,225,459 | 12/1940 | Palmrose | 209/173 |
| 2,237,442 | 4/1941 | Macfarlane | 99/570 X |
| 2,679,273 | 5/1954 | Harrison | 99/628 X |
| 3,139,919 | 7/1964 | Rivera | 99/628 X |
| 3,367,495 | 2/1968 | Lea et al. | 209/156 X |

Primary Examiner—Stanley N. Gilreath
Attorney, Agent, or Firm—Toren, McGeady and Stanger

[57] ABSTRACT

Apparatus for treating beans such as soybeans, comprising means for hulling the beans, such as a disk-type hulling device, and a running-water-type hull and seed separating device in which the hull and the seed are separated by water flows having different velocities.

7 Claims, 8 Drawing Figures

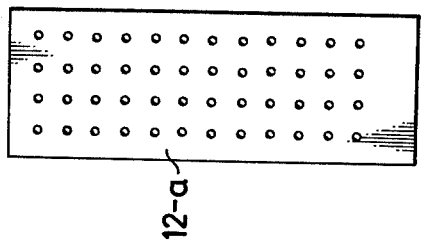
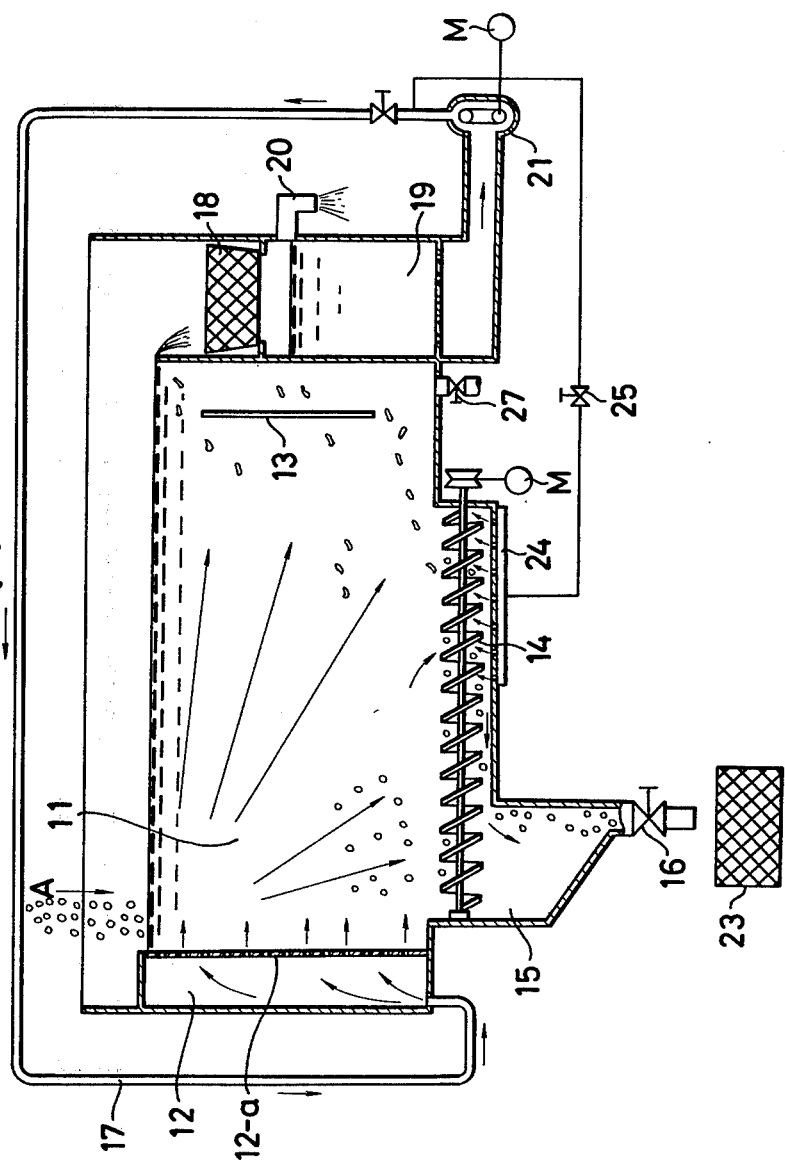

BEAN TREATING APPARATUS

BACKGROUND OF THE INVENTION

In recent years beans have come to be utilized over a wide range of applications and accordingly their effective utilization and treatment has become an important endeavor.

For example, the effective utilization of the soybean refuse generated during tofu production is one of these endeavors. However, there are various qualities of bean refuse. Thus there are considerble differences in the practicality of utilizing refuse such as, for example, bean refuse from hulled soybeans compared to bean refuse from soybeans still having their hulls on. The hulled soybean refuse has the potential possibility of being utilized to a rather higher degree as a food.

Prior U.S. patent application Ser. No. 804,435 relates to a device for the production of food products by utilizing whole-grain soybeans. The present invention is intended to provide an apparatus for treating various beans, particularly soybeans comprising apparatus for hulling the soybeans and for separating the outer hulls from the beans which may be utilized in the invention of said prior application.

SUMMARY OF THE INVENTION

The present invention is a bean treating apparatus comprising means for hulling beans, such as a disk-type hulling device having two disks, one fixed and the other rotating, set in a position parallel and opposing to each other with a clearance being provided between the disks which can be freely adjusted to accomodate and trap the soaked beans which are dropped between the disks and then split into halves as they are moved in the direction of the rotation with the hulling action being simultaneously carried out. A running-water-type hull and seed separating device which is a water tank has the aforementioned hulls and seeds introduced into one end thereof. These hulls and seeds are separated by water having varying flow rates which is caused to flow from one side of the tank.

The apparatus of the present invention will be described by referring to the attached drawings.

BRIEF EXPLANATION OF THE DRAWINGS

FIG. 1 (b) shows a vertical cross section of the device shown in FIG. 1 (a).

FIG. 2 (a) shows a cross section of a running-water-type hull and seed separating device of the present invention.

FIG. 2 (b) shows a perforated plate used in the rectifying device used in the separation tank used in the present invention.

FIG. 3 (b) to FIG. 3 (d) show positions of the rectifying control plate.

DETAILED DESCRIPTION OF THE INVENTION

Figure 1:
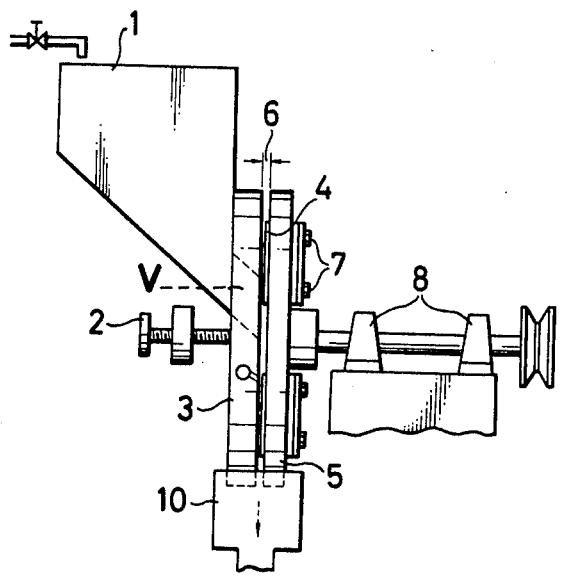
FIG. 1 (a) shows a side view of a disk-type hulling device according to the present invention.

In FIG. 1, 1 is the material feed hopper, and the raw material beans, together with water, drop into the space 6 between the fixed disk 3 and the revolving disk 5 through an opening in the disk 3 shown in dotted line in FIG. 1(a), these beans being moved as the revolving disk rotates, and being split into halves and simultaneously hulled. A scraper 4 scrapes off hulled material from the disk 3 and clears space 6. The disk clearance 6 is adjusted by means of a disk clearance control bolt 2 in accordance with the size of the beans, but usually a value of 70 to 80% of the bean diameter is appropriate. 7 is a bolt for adjusting the scraper.

The hulled beans exiting from the above device and operation are washed down by water from a water sprayer 9 and pass through a collection chute 10, dropping into a hull and seed separating tank 11 as shown in FIG. 2 (a). This water tank is rectangular and the hull fraction and the cotyledon fraction from the seeds split into halves fall into this tank at one end A of it and are then separated from each other due to the difference in their specific gravities as they float in water flowing from the rectifying tank 12. The rectifying tank 12 comprises a perforated plate 12-a as shown in FIG. 2 (b), through which the water is spouted under pressure to cause a water flow in the separation tank. It is preferable that the total area of the perforation is not more than $\frac{2}{3}$ of the cross sectional dimension of the pipe 17 which is provided for returning water to the rectifying tank 12.

The cotyledon fraction falls inside a screw conveyor 14 driven by a motor M and is then stored in a stock tank 15. On the other hand, the hulls float up and enter the hull collection pan 18 together with the overflowing water, and the water enters a water storage tank 19 and excessive water is exhaused from the exhaust pipe 20. This water, by virtue of a pump 21 driven by a motor M, is used again for the separation. Since there is likely to be a bit of hulls contaminating the cotyledons at the far end of the screw conveyor 14, an auxiliary water jet 24 is preferably employed to blow them up and toward the overflow. This is regulated by an auxiliary water jet control valve 25.

The rectifying control plate 13 is preferably composed of four separated plates as shown in FIG. 3 (a), each being designed to slide up and down along guide rails 26 provided on the side walls of the separation tank 11.

Figure 3A:
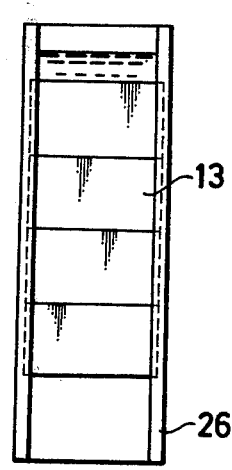
FIG. 3 (a) shows rectifying control plate used in the separation tank according to the present invention.
Figure 3B:
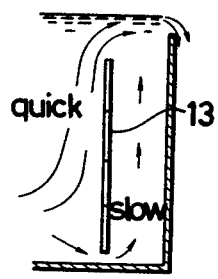
Figure 3C:
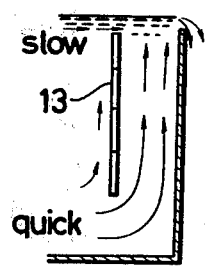
Figure 3D:
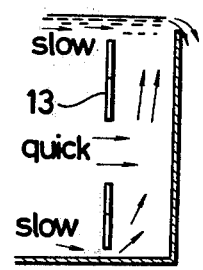

By adjustment of the position, a lower, upper or middle position, for example, of the rectifying control plate 13, the water flow from the rectifying tank 12 can be partially changed into varied states as shown in FIGS. 3b–3d in the vicinity of the plate 13.

Thus, when the plate 13 is at a lower position as shown in FIG. 3 (b), a quicker water flow is obtain in the upper portion, while when the plate 13 is positioned at an upper position as shown in FIG. 3 (c), a quicker water flow is obtained in the lower portion of the tank.

Meanwhile, when the plate 13 is separated into the upper portion and the lower portion as shown in FIG. 3 (d), a quick water flow is obtained at the middle portion of the tank.

With regard to the question of why water flow must be varied by the rectifying or control plate 13, it is noted that the cracked soybeans and hulls coming from the hulling machine are arranged to fall into the separation tank 11.

Soybeans are allowed to sink to the bottom part of the separation tank while the hulls are arranged to overflow the tank 11 for separation of the hulls from the soybeans. However, the size and specific gravity of each soybean or hull will differ from those of other soybeans or hulls. Therefore the material will sink in varied degrees. Particularly, the distribution of the hulls flowing within the tank 11 from the rectifying tank 12 toward the area or the vicinity of the control plate 13 will vary to a substantial degree. Therefore, the control plate is adjusted into a position, as shown in FIG. 3(b), whereby many of the hulls in the vicinity of the plate 13 will be in a relatively higher area within the separation tank. The control plate 13 may also be adjusted as shown in FIG. 3(c) when the hulls are in a relatively lower area within the separation tank. Another state shown in FIG. 3(d) indicates the condition when the hulls are in a middle area so that they may be allowed to overflow as desired. In general, the control plate 13 will operate to enable varying control of the flow of the hulls to the overflow portion of the tank for collection within the pan 18.

The quantity of water flowing from the tank 12 into the separation tank 11, and overflowing the tank 11 into the pan 18, is maintained to be generally unvarying. Therefore, adjustment of the plate 13 as shown in FIGS. 3(b) 3(d) will not cause change in the velocity of the water which is flowing between the tank 12 and the opposite side of the tank 11. What is changed by the adjustment of the plate 13, as shown in FIGS. 3(b)-3(d) is the manner of flow in which the water will pass through the vicinity of the control plate 13.

The cotyledons are stored in the stock tank 15 until a fixed amount is obtained; then a valve 16 opens and these are flushed out together with water and enter a collection pan 23 where the water is drained off. When a high level of separation is required due to the application, it is possible to increase the separability by employing salt water instead of plain water. The level of water in the tank 11 is adjusted by opening and closing the valve 27.

As described above, the hulling apparatus of the present invention is one which carries out hulling and separation of the hulls and seeds by means of an extremely simple hulling device having only 2 disks, and a water tank which has water flowing in it at different flow rates at the top and bottom. This apparatus, furthermore, has the special feature that the cotyledons are not damaged or finely ground during operation and so there is no drop in the yield.

Figure 1B:
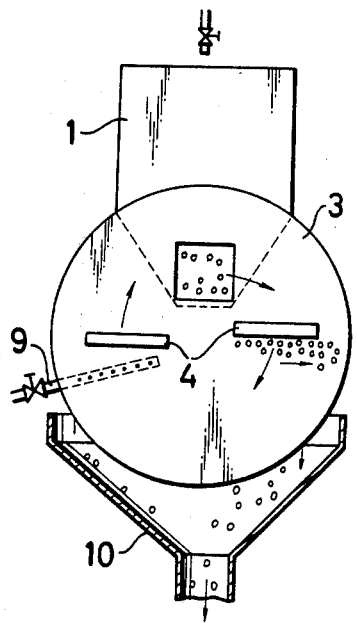

With regard to the entry of beans between the discs 3 and 5, as shown in FIGS. 1(a) and 1(b), there is shown an opening extending through the disc 3. This opening is shown in dotted line form in FIG. 1(a) and it is shown at the centrally upper portion of FIG. 1(b) as a square opening extending through the face of the disc 3. The beans from the feed hopper 1 enter into the clearance space 6 through this opening and they are thus brought into position within the clearance 6. It will be apparent that this will insure that the beans are properly engaged within the clearance 6 between the discs 3 and 5.

Although the space between the discs 3 and 5 is less than the thickness of the beans at the opening, the beans will nevertheless be forced into the space by the scraper 4 where they will be split and hulled by the discs inasmuch as the beans will be watered in the feed hopper 1 prior to entry between the discs.

With reference to the drawings, it will be seen that in the operation of the invention the raw material feed hopper 1 is attached to the fixed disc 3 with the beans entering into the clearance space 6 through an opening or channel V extending through the disc 3. Thus, raw soybean material in the hopper 1 will pass through the channel V of the disc 3 and as the revolving disc 5 rotates, most of the soybeans will be cracked into halves within the space 6 between the disc 3 and the revolving disc 5 by the friction therebetween with the space 6 between the discs 3 and 5 being maintained at only about 70 to 80 percent of the soybean diameter. The hulls of the soybeans are peeled there and the cracked soybeans and their hulls will drop into a collection chute or cover 10. Some of the cracked soybeans and their hulls will stick or accumulate between the discs 3 and 5. Sticking soybeans and their hulls which cannot be readily removed will be forced or wiped off and caused to fall on the collection cover 10 by means of the scrape 4.

The scraper 4 is attached to the revolving disc 5 and is arranged to sweep the cracked soybeans and hulls from the space 6 by coming into contact with the fixed disc 3 while the disc 5 rotates. However, since the diameter of the soy bean material varies, it may become necessary to adjust the spacing 6 in accordance with the diameter of the soybean material. When the space 6 is adjusted, the scraper 4 must also be adjusted accordingly be means of the scraper adjustment bolts 7 in order to allow the scraper 4 to come into close contact with the fixed disc 3. For this adjustment, the scraper 4 is arranged either to be moved toward or away from the fixed disc 3 and parallel with the shaft of the revolving disc 5.

While specific embodiments of the invention have been shown and described in detail to illustrate the application of the inventive principles, it will be understood that the invention may be embodied otherwise without departing from such principles.

What is claimed is:

1. Apparatus for hulling beans and for separating hulls from seeds comprising: initial hulling means receiving beans and effecting initial separation operation to remove the bean hulls from the seeds, said initial hulling means operating to exhaust therefrom the separated hulls and seeds through a joint flow path; flowing water separation means receiving said hulls and seeds from said initial hulling means and performing a further separation process, said flowing water separation means comprising a generally quadrilateral water tank; water supply means at one end of said tank introducing water into said tank at said one end and directing said water flow toward the opposite end of said tank, said tank including at said opposite end overflow wall means, said water flow being directed to overflow said overflow wall means; means for introducing into said tank at a location generally above said one end said hull and seed exhaust from said initial hulling means; seed collection means located at the bottom of said tank toward said one end thereof; hull collection means located adjacent said overflow wall means for collecting said water overflowing therefrom and hulls entrained in said overflowing water; and control plate means located within said tank in the vicinity of said opposite end thereof generally adjacent but spaced from said overflow wall means, said control plate means comprising a plurality of separable planar members each vertically aligned with each other to extend within a generally common vertical plane, said planar members being vertically movable relative to each other to effect control over said water flowing toward said overflow wall means at said opposite end of said tank.

2. Apparatus according to claim 1 wherein said planar members of said control plate means are adapted to be moved together to form a single vertically extending plate member which may be raised and lowered within said tank.

3. Apparatus according to claim 1 wherein said initial hulling means comprise a stationary disk and a rotating disk arranged with a face of one of said disks opposed to and parallel to a face of the other of said disks, with a clearance being provided between said opposed parallel faces into which said beans are received in order to effect said initial separation operation, said disks being mounted to enable adjustment of said clearance therebetween.

4. Apparatus according to claim 3 further comprising an elongated screw conveyer located in the bottom of said water tank.

5. Apparatus according to claim 3 wherein said water supply means comprise a perforated plate through which water is introduced into said tank.

6. Apparatus according to claim 3 further comprising scraper means on said opposed face of said rotating disk located to extend to within said clearance for clearing said hulls and seeds from said clearance.

7. Apparatus according to claim 3 wherein said beans are introduced into said clearance between said disk faces through an opening in the face of said stationary disk.

* * * * *